(12) United States Patent
Andrews et al.

(10) Patent No.: US 8,123,174 B2
(45) Date of Patent: Feb. 28, 2012

(54) METHODS AND APPARATUS FOR AN INTEGRATED INSTRUMENTATION MODULE FOR A THERMAL PROTECTION SYSTEM

(75) Inventors: Thomas L. Andrews, Newport Beach, CA (US); Leora Peltz, Pasadena, CA (US); Robert V. Frampton, Pasadena, CA (US)

(73) Assignee: The Boeing Company, Chicago, IL (US)

( * ) Notice: Subject to any disclaimer, the term of this patent is extended or adjusted under 35 U.S.C. 154(b) by 1510 days.

(21) Appl. No.: 11/766,046

(22) Filed: Jun. 20, 2007

(65) Prior Publication Data

US 2011/0036953 A1 Feb. 17, 2011

(51) Int. Cl.
*B64G 1/66* (2006.01)
(52) U.S. Cl. .................................... 244/171.8
(58) Field of Classification Search ............... 244/171.7, 244/171.8; 702/56, 130, 141, 182, 183, 184, 702/185; 374/141, 143, 179
See application file for complete search history.

(56) References Cited

U.S. PATENT DOCUMENTS

| | | | |
|---|---|---|---|
| 6,744,376 B1 * | 6/2004 | Pascalidis | 340/870.21 |
| 6,915,843 B2 * | 7/2005 | Kroliczek et al. | 165/104.33 |
| 2004/0245373 A1 * | 12/2004 | Behrens et al. | 244/10 |
| 2005/0061919 A1 * | 3/2005 | Mueller et al. | 244/161 |

OTHER PUBLICATIONS

Jeff Herath, Project Overview System Design Review (MEDLI-SDR-0210), May 1, 2007.*

* cited by examiner

*Primary Examiner* — Timothy D Collins
*Assistant Examiner* — Nicholas McFall
(74) *Attorney, Agent, or Firm* — Yee & Associates, P.C.

(57) ABSTRACT

An integrated instrumentation system includes a body comprising a thermal protection system (TPS) material (e.g., an ablatable material), one or more sensors embedded within the body, and a processor (e.g., an FPGA or the like) communicatively coupled to the plurality of sensors. The processor is configured to acquire sensor signals from the plurality of sensors and produce digital sensor data associated therewith. The sensors may include, for example, recession sensors, pressure transducers, thermocouples, and accelerometers.

15 Claims, 3 Drawing Sheets

METHODS AND APPARATUS FOR AN INTEGRATED INSTRUMENTATION MODULE FOR A THERMAL PROTECTION SYSTEM

TECHNICAL FIELD

The embodiments described herein generally relate to thermal protection systems used in conjunction with spacecraft and the like, and more particularly relate to methods and apparatus for sensing the state of such thermal protection systems.

BACKGROUND

Thermal protection systems (TPS) used in connection with spacecraft, atmospheric entry vehicles, hypersonic vehicles and the like typically consist of an outer layer of ablative insulating material formed over a metallic or composite substrate. By gradually ablating or changing phase under extreme thermal exposure, the ablative layer protects the spacecraft from the intense heat produced by friction as it moves through a gaseous atmosphere. As ablation involves phase change of a material followed by exfoliation or physical transport and recession of a charred surface layer of TPS material, it is desirable to monitor the rate of recession and the thermal performance of the TPS material (e.g., during reentry). This is particularly the case during initial entries of a new spacecraft heat shield where it is desirable to validate actual flight environments and thermal performance to predicted performance based on ground-based testing and analysis.

Known methods of sensing the state of TPS systems include the use of numerous sensors embedded in the TPS and remote electronic circuits that interface with the sensors, read the signals, convert the signals to digital data, and transmit the signals to a flight computer or data recording device. Such circuits may include voltage amplifiers, multiplexers, analog-to-digital converters, pressure-to-electrical transducers, and serial digital transmission circuits. The ambient temperature range for such devices is limited to the operating specifications of the electronics—typically −55° C. to 125° C. The ambient temperature on the backside of the TPS can reach as high as 260° C. Therefore, the electronic circuits that perform the interface to the TPS sensors are typically located away from the TPS shield or enclosed in protective box for thermal conditioning. Such boxes add substantial mass, complexity and cost to the TPS system.

Furthermore, when the interfacial electronic circuits are located away from the TPS layer, longer wires are required to connect the TPS sensors to the system. Heavier gauge connecting wires are typically used because they exhibit lower resistivity and minimize errors resulting from the resulting voltage drop, but are heavier and thus increase overall sensor system mass.

Accordingly, it is desirable to provide compact and lightweight systems for sensing the state of a TPS layer and its operating environment. Furthermore, other desirable features and characteristics of the various embodiments will become apparent from the subsequent detailed description and the appended claims, taken in conjunction with the accompanying drawings and the foregoing technical field and background.

BRIEF SUMMARY

Methods and apparatus are provided for determining the state of a thermal protection system (TPS). In one embodiment, an integrated instrumentation system includes a body comprising a thermal protection system (TPS) material (e.g., an ablative material), one or more sensors embedded within the body, and a processor (or FPGA circuit or the like) communicatively coupled to the plurality of sensors. The processor is configured to acquire sensor signals from the plurality of sensors and produce digital sensor data associated therewith, which may be sent to a flight computer or recording device through an RF link or through lightweight digital bus wiring. The sensors may include, for example, recession sensors, pressure transducers, thermocouples, and accelerometers. By integrating the sensors close to the processor in this way, connections are streamlined, weight is reduced, installation is simplified, noise is reduced, and overall system efficiency is improved.

BRIEF DESCRIPTION OF THE DRAWINGS

Various embodiments will hereinafter be described in conjunction with the following drawing figures, wherein like numerals denote like elements.

DETAILED DESCRIPTION

Figure 1:
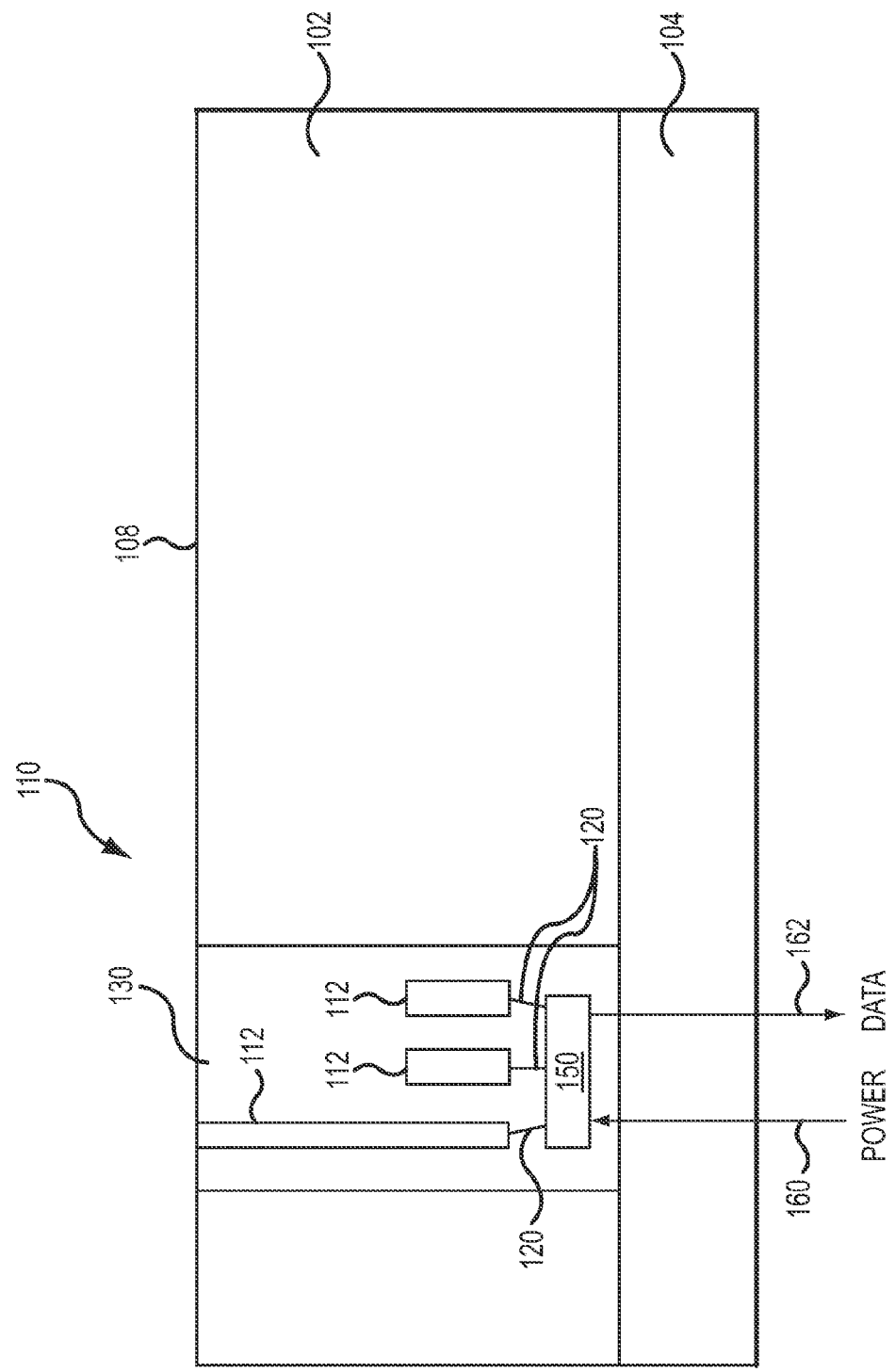
FIG. 1 is a cross-sectional overview of a TPS system in accordance with one embodiment.

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to assist improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The embodiments of the invention described herein are, for example, capable of use in sequences other than those illustrated or otherwise described herein. Unless expressly stated otherwise, "connected" means that one element/node/feature is directly joined to (or directly communicates with) another element/node/feature, but not necessarily mechanically. Likewise, unless expressly stated otherwise, "coupled" means that one element/node/feature is directly or indirectly joined to (or directly or indirectly communicates with) another element/node/feature, but not necessarily mechanically.

The terms "comprise," "include," "have" and any variations thereof are used synonymously to denote non-exclusive inclusion. The terms "left," "right," "in," "out," "front," "back," "up," "down," and other such directional terms are used to describe relative positions, not necessarily absolute positions in space. The term "exemplary" is used in the sense of "example," rather than "ideal."

In the interest of conciseness, conventional techniques, structures, and principles known by those skilled in the art may not be described herein, including, for example, conventional spacecraft structural design, basic principles of thermal protection systems and materials, data acquisition systems, and basic sensor technologies.

Referring now to FIG. 1, an exemplary integrated instrumentation system (or "TPS module") 110 is incorporated, inserted, or otherwise integrated into an exterior TPS layer 102 of a spacecraft, entry vehicle, or other such apparatus. The term "spacecraft" is used herein as a general term to refer to such vehicles, and is not meant to limit the range of embodiments. Layer 102 is typically bonded to or formed on a metallic or composite substrate 104. In the illustrated embodiment, TPS module 110 extends through the entire thickness of layer 102 (i.e., extending from substrate 104 to a surface 108, which is exposed to the external environment). The invention is not so limited; TPS module 110 may extend any convenient depth within layer 102.

TPS module 110 includes a body 130 comprising a thermal protection system TPS material, one or more sensors 112 embedded within body 130, and a processor 150 communicatively coupled (e.g., through connectors 120) to the plurality of sensors 112. In this regard, the term "processor" is used to refer to an FPGA, microcontroller, or any other combination of hardware, software, and firmware that fulfills the stated tasks. Processor 150 is generally configured to acquire sensor signals from sensors 112 and produce digital sensor data associated therewith, which may be sent via communication line 162 to a flight computer (not shown), wirelessly or through a conventional wired connection. Processor 150 and/or sensors 112 receive power through a suitable power line 160, which may be provided in accordance with known power supply configurations. Sensors 112 may include, but are not limited to, recession sensors, pressure transducers, thermocouples, and accelerometers, as described in further detail below.

Body 130 may have any convenient shape, including rectilinear shapes, curvilinear shapes, or a combination thereof. In one embodiment, body 130 is generally an elongated shape (e.g., a cylinder) configured to fit within a matching hole or opening in the exterior TPS layer of the spacecraft. The size may vary depending upon the intended environment, number of sensors, nature of the TPS material, and other applicable design standards.

Figure 2:
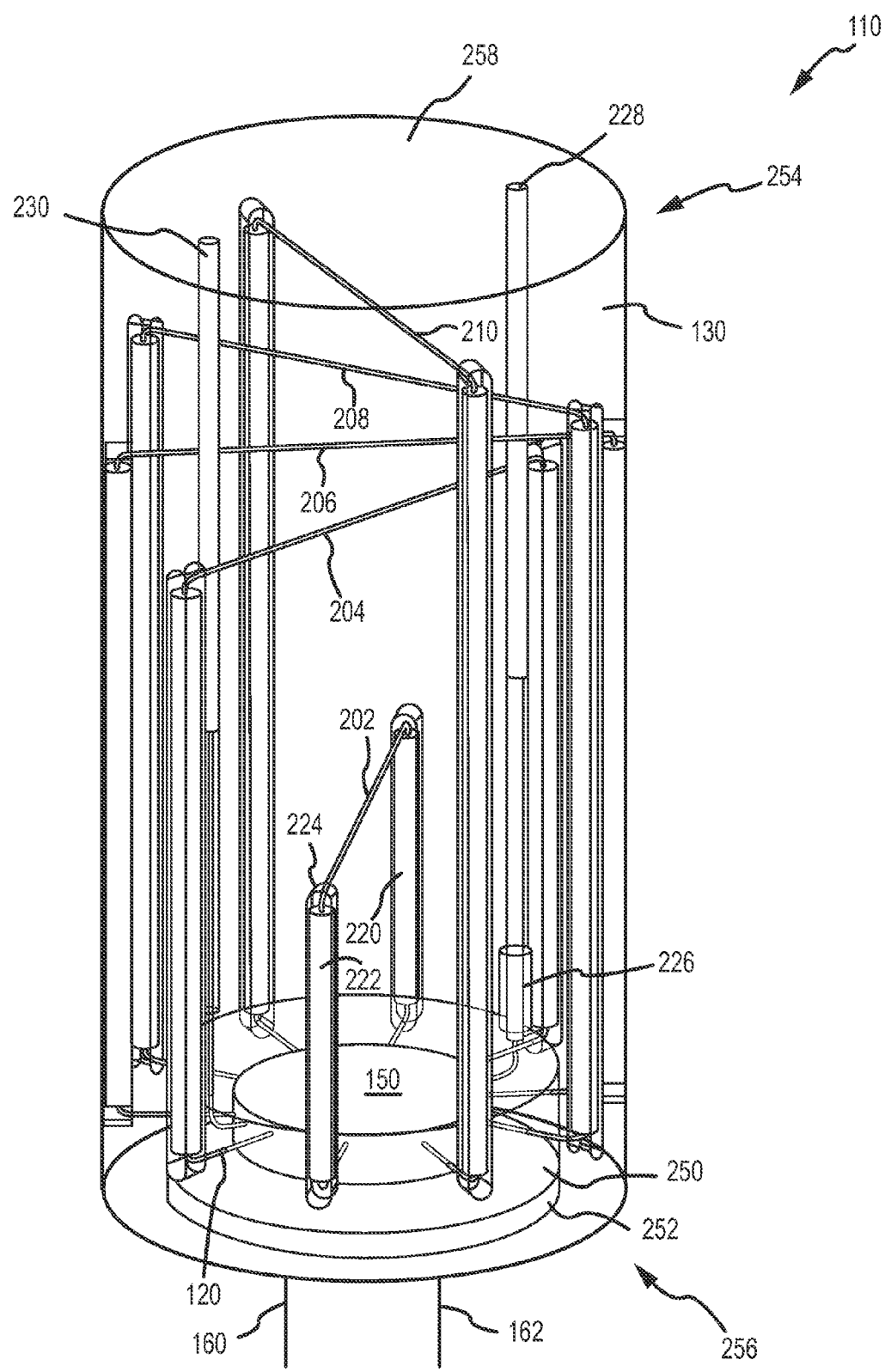
FIG. 2 is an isometric, partially-transparent view of a TPS system in accordance with one embodiment.

Referring to FIG. 2, an exemplary cylindrical TPS module 110 is illustrated. As shown, TPS module 110 has one end 254 that is configured to be exposed to the external environment, and a second end 256 opposite the first end. As the temperature gradient along the length of TPS module 110 is such that end 254 will be substantially hotter than end 256, it is advantageous to position processor 150 close to the cooler end—i.e., end 256. In one embodiment, a heat-sink or other cooling system is incorporated into TPS module 110. In the illustrated embodiment, for example, a phase-change cooling structure 250 and base 252 are in thermal communication with processor 150, assisting with cooling the system during operation.

The embodiment of FIG. 2 includes a number of embedded sensors distributed throughout body 130. A recession sensor 230, for example, extends to surface 258 of body 130, and is configured to produce a signal indicative of how much of recession sensor 230 has been ablated away (i.e., how much remains), thus giving an indication of the rate and extent of ablation of body 130 as a function of time during atmospheric entry.

A number of thermocouples (202, 204, 206, 208, and 210) are advantageously distributed along the length of body 130 to provide a number of temperature measurements, thereby allowing the flight computer to determine the thermal profile of TPS module 110 as a function of time during atmospheric entry. Thermocouples such as these produce a voltage across the junction of dissimilar metals that is correlatable with its temperature. Such thermocouples are well known in the art, and may, as illustrated, include active linear segments (e.g., 202) extending between ends of support structures (e.g., 222 and 220). To provide further protection, insulating sleeves 224 (e.g., ceramic insulators) may be provided to protect these support structures where the TPS materials are conductive.

Also illustrated in FIG. 2 is a pressure sensor 226 coupled to a pressure port 228 that extends to surface 258 at end 254, and likewise may be ablated away during flight. Additional devices such as accelerometers, acoustic and shock sensors, and the like may also be embedded within body 130 and/or integrated with processor 150. One such sensor is a g-shock sensor used to determine micrometeor impact on the surface of the spacecraft. Each sensor 202, 204, 206, 208, 210, 226, and 230 are electrically coupled to processor 150 via metal wires, tracers, pins, or any other suitable connection method.

A variety of materials may be used for body 130 of TPS module 110—including ablatable materials (i.e., materials that gradually wear off the surface exposed to the friction of the external environment) and non-ablatable materials. In one embodiment, a ceramic foam material is used. In another, the TPS material is the same as the surrounding TPS material (102 in FIG. 1) such that the sensor data will be representative of the heat shield performance as a whole.

Processor 150 may includes any combination of hardware, software, and/or firmware capable of carrying out the functions set forth herein. Thus, processor 150 may include a standard microprocessor, microcontroller, custom ASIC, or the like, used in conjunction with memory devices and other conventional electronic components. In one embodiment, given the high temperatures to which the components will be exposed, it is desirable for processor 150 to be manufactured using thermally-robust materials—e.g., silicon carbide (SiC), silicon germanium (SiGe), gallium nitride (GaN,) and/or silicon on insulator (SOI) technologies.

Figure 3:
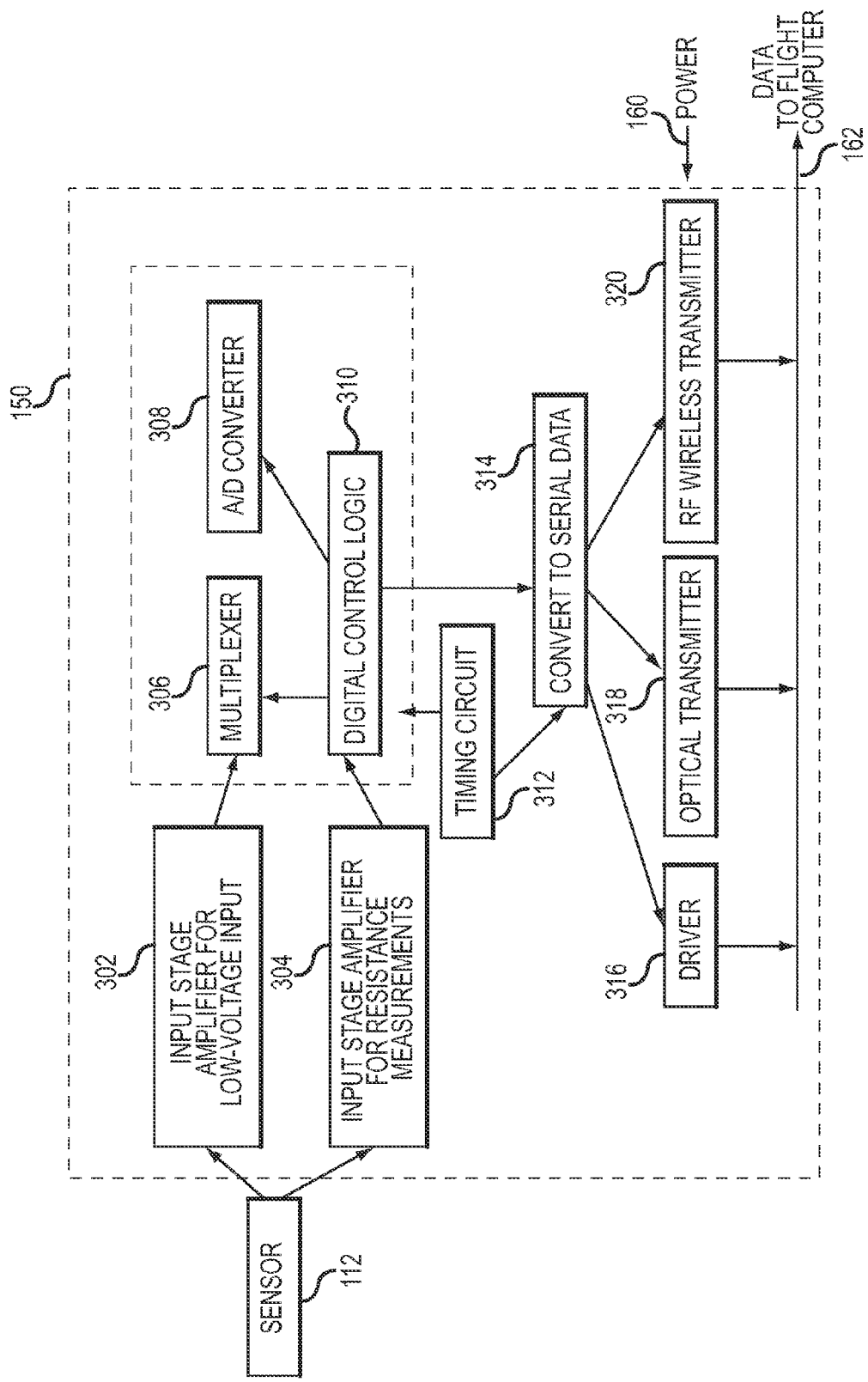
FIG. 3 is a conceptual block diagram of a TPS system in accordance with one embodiment.

Referring to FIG. 3, an exemplary processor 150 receives signal data from sensors 112, and produces digital data 162 which may be provided to an associated flight computer or recording device (not shown). In the illustrated embodiment, processor 150 includes a first input state amplifier 302 for low-voltage input, a second input state amplifier 304 for resistance measurements, and a multiplexer 306 coupled to and selectively receiving signals from input stages 302 and 304. Multiplexer 306 is coupled to an analog-to-digital (A-to-D) converter 308 and digital control logic 310, which controls general operation of processor 150.

In general, in this embodiment, multiplexer 306 receives sensor input via input stages 302 and 304. Input stage amplifier 302, used for low-voltage input, includes an amplifier suitable for producing a signal within the desired range of voltage values, which may vary depending upon the application. Input stage 304 includes suitable circuitry configured to convert resistance measurements (e.g., from a recession sensor) to a similarly-ranged voltage value. Such circuits are known in the art, and thus need not be described herein.

Digital control logic 310 (embodied in hardware, software, or a combination thereof as is known in the art) coordinates multiplexer 306, A/D converter 308, and communicates the resulting digital value to block 314, which converts the resulting digital word to appropriate serial data. A timing circuit 312 provides one or more clocks to digital control logic 310 and block 314. The serial data is transmitted to flight computer 162 via one or more of driver 316, optical transmitter 318, or RF wireless transmitter 320, and may conform to any convenient data communication protocol, including standardized protocols and proprietary protocols. Example protocols include the RS-232, RS-485 standards and the Bluetooth wireless standard.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An integrated instrumentation system for a spacecraft comprising:
    a body comprising a module of thermal protection system (TPS) material, the body characterized by a first end, a second end, and a length, the first end of the body positioned proximate to an external surface of the spacecraft;
    a plurality of sensors embedded within the body, the plurality of sensors comprising a plurality of thermocouples distributed at different positions along the length of the body, a recession sensor extending to the external surface, and a pressure sensor having a port extending to the external surface;
    a processor communicatively coupled to the plurality of sensors, the processor configured to acquire sensor signals from the plurality of sensors and produce digital sensor data associated therewith, and the processor embedded in the second end of the body; and
    a phase-change cooling structure thermally coupled to the processor.

2. The system of claim 1, wherein the processor is communicatively coupled to a flight computer system and is configured to send the digital sensor data thereto.

3. The system of claim 1, wherein the TPS material comprises a ceramic foam.

4. The system of claim 1, wherein the TPS material is ablatable.

5. The system of claim 1, wherein the plurality of sensors includes at least one pressure transducer.

6. The system of claim 1, wherein the plurality of sensors includes at least one accelerometer, shock sensor, or vibration sensor.

7. The system of claim 1, wherein the body is substantially cylindrical.

8. The system of claim 1, wherein the plurality of sensors includes at least two thermocouples located at different positions between the first and second ends of the body.

9. The system of claim 1, wherein the processor is further configured to selectively acquire the sensor signals and to condition the signals to produce the digital sensor data.

10. An integrated instrumentation system extending to an external surface of a spacecraft, comprising:
    a body comprising a module of ablatable thermal protection system (TPS) material, wherein the body has a first end exposed to an external environment, and a second end opposite the first end;
    a plurality of sensors embedded within the body, wherein the plurality of sensors includes a recession sensor configured to measure a rate of ablation of the TPS material, and at least two thermocouples located at different locations with respect to the first and second ends of the body;
    a processor embedded in the second end of the body and communicatively coupled to the plurality of sensors, the processor configured to acquire sensor signals from the plurality of sensors and produce digital sensor data associated therewith; and
    a phase-change cooling structure thermally coupled to the processor.

11. The system of claim 10, wherein the body is substantially cylindrical.

12. The system of claim 10, wherein the plurality of sensors includes at least one additional sensor selected from the group consisting of accelerometers and pressure transducers.

13. A method for sensing the state of an external thermal protection layer and the local atmospheric conditions of a spacecraft, comprising:
    providing an integrated instrumentation system including a modular body comprising a thermal protection system (TPS) material, the body characterized by a first end, a second end, and a length, the first end of the body positioned proximate to an external surface of the spacecraft, a plurality of sensors embedded within the body, and a processor embedded in the second end of the body and communicatively coupled to the plurality of sensors, the processor configured to acquire sensor signals from the plurality of sensors and produce digital sensor data associated therewith, and a phase-change cooling structure thermally coupled to the processor;
    incorporating the integrated instrumentation system into the external thermal protection layer of the spacecraft; and
    coupling the integrated instrumentation system to a flight computer configured to receive the digital sensor data.

14. The method of claim 13, wherein incorporating the integrated instrumentation system includes forming a cavity in the external thermal protection layer of the spacecraft, wherein the cavity is configured to accept the integrated instrumentation system.

15. The method of claim 13, wherein providing the integrated instrumentation system includes embedding within the body a sensor selected from the group consisting of accelerometers, pressure transducers, thermocouples, and recession sensors.

* * * * *